Aug. 22, 1961  E. C. BOULTINGHOUSE  2,997,330
COMBINATION COVER AND CARRYING RACK FOR PICK UP TRUCKS
Filed Oct. 10, 1960  2 Sheets-Sheet 1
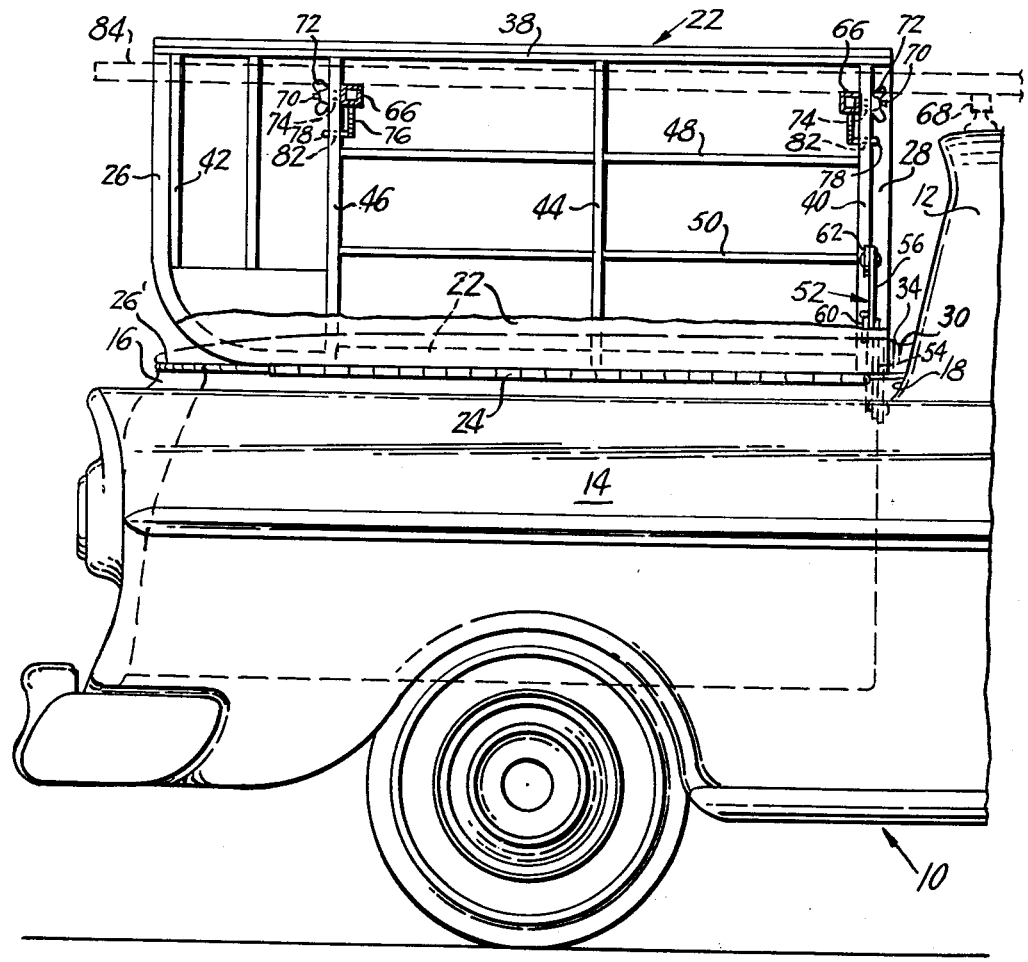
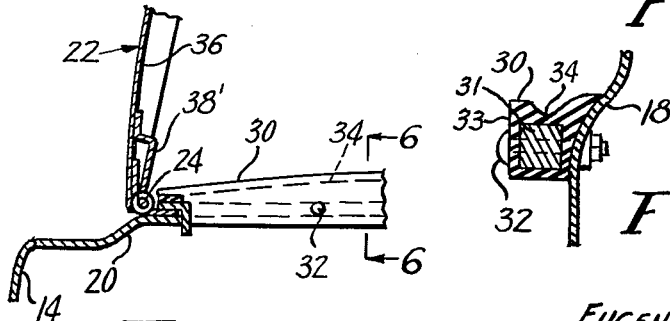
INVENTOR.
EUGENE C. BOULTINGHOUSE
BY
Gustave Miller
ATTORNEY Aug. 22, 1961     E. C. BOULTINGHOUSE     2,997,330
COMBINATION COVER AND CARRYING RACK FOR PICK UP TRUCKS
Filed Oct. 10, 1960     2 Sheets-Sheet 2

INVENTOR.
EUGENE C. BOULTINGHOUSE
BY
*Gustave Miller*
ATTORNEY

United States Patent Office 2,997,330
Patented Aug. 22, 1961

2,997,330
COMBINATION COVER AND CARRYING RACK FOR PICK UP TRUCKS
Eugene C. Boultinghouse, 364 N. Ivy Ave., Monrovia, Calif.
Filed Oct. 10, 1960, Ser. No. 61,686
10 Claims. (Cl. 296—3)

This invention relates to a combination cover and carrying rack for pick up trucks, and more particularly to a hinged cover means adapted to be secured to the opposite upstanding walls of an open truck or the like and rack means detachably securable to the cover means when open for providing a load carrying means.

Small trucks, such as sport trucks and pick up trucks of many different makes, are becoming increasingly popular, such trucks usually having a covered cab similar to that of a passenger automobile, and a rear compartment that is upwardly open. However, they are generally subject to the disadvantage that the rear compartment is open to the elements, and that the length of articles that can be carried in the rear compartment is limited by the length of the rear compartment, that they cannot extend too far from the rear end, of course, cannot extend forwardly of the compartment because of the presence of the usual forward wall in the compartment. In addition, articles packed in the trunk are open to view, even though they may be unsightly and therefore detract from the overall appearance of the vehicle.

It is an object of this invention to overcome the aforesaid disadvantages by equipping a truck of the above type with cover means on the normally open compartment which can be easily and quickly opened and closed, and with means providing a tight fit with the forward wall of the compartment.

A further object of this invention is to provide cover means for a pick up truck compartment with a detachable rack means which can cooperate with the cover means when in open position for carrying a load above the compartment, which load may extend forwardly of the compartment over the driver's position and over the truck cab, if necessary, when a truck cab is present.

A further object of this invention is to provide a truck of the aforesaid type with cover means of simple construction and neat appearance and, in addition, with load carrying detachable rack means cooperating with the cover means when the cover means is in open position.

In brief, this invention includes a pair of cover lids that may be securely hinged to the opposite longitudinally extending upstanding walls of a pick up or sport truck rear compartment, which may be closed together to provide a secure cover thereto, and which have means for holding them in upward position and which, when in upward open position, act to cooperate with the rack means detachably secured to the cover lids for carrying a load thereon.

With the foregoing and other related objects in view, this invention comprises the details of construction and combination of parts as hereinafter set forth and disclosed, and illustrated in the accompanying drawings, in which:

FIG. 1 is a side elevational view of the right hand side of the truck portion of a pick up truck, to which this invention has been applied.

FIG. 3 is a fragmentary detail of the hinge means pivoting one cover lid to the top of the compartment side wall, and showing a combination drain and fill piece or adapter bar attached to the forward wall to provide a tight fit when the cover is closed.

FIG. 6 is a section of the fill piece on line 6—6 of FIG. 3.

Figure 2:
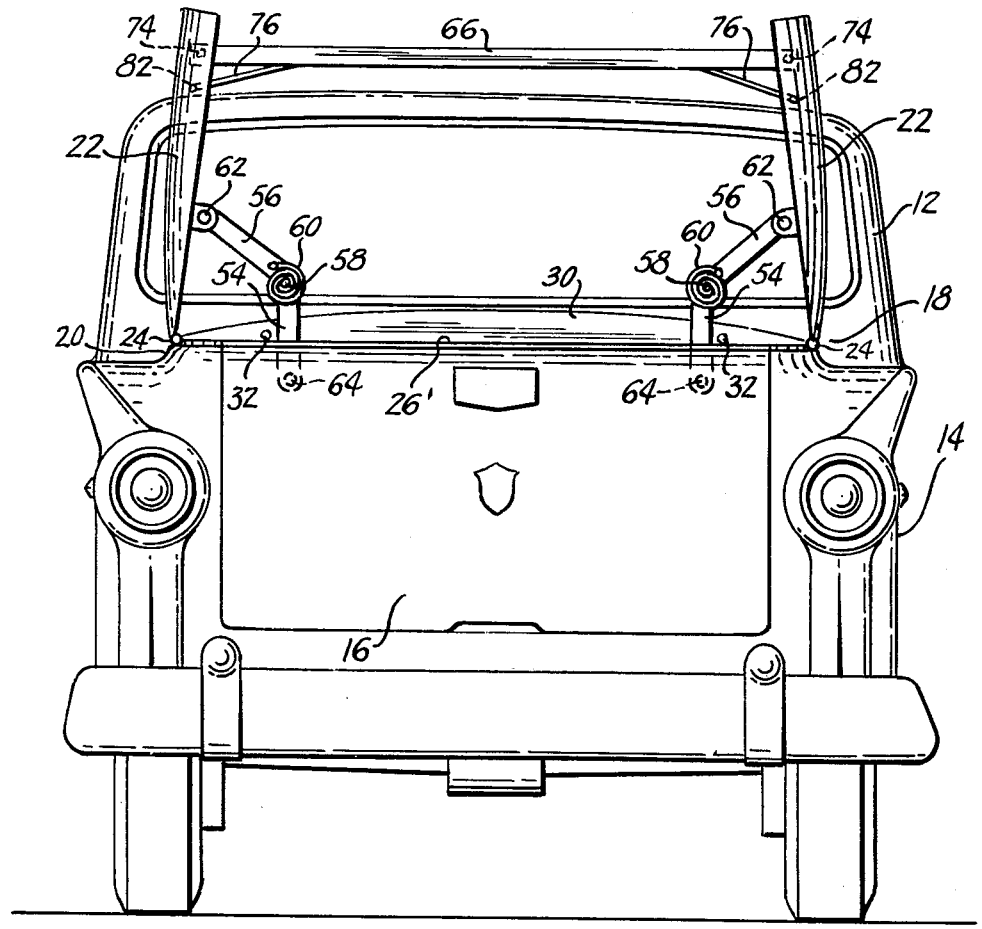
FIG. 2 is a rear elevation of a vehicle with this invention shown thereon in operative position.

There is shown at 10 the vehicle to which this invention is applied. This vehicle comprises the type usually known as a pick up truck, that is, a truck having a passenger compartment, generally a closed cab 12 and an upwardly open rear compartment consisting of upwardly extending side walls 14, a rearwardly opening tail gate 16 and a forward wall (not shown), which is generally the bottom portion of the cab rear wall 18. Such vehicles have been generally known as pick up trucks, but in recent years, some models or styles of this vehicle are known as sport trucks, but this invention is applicable to any such type of vehicle.

In the particular style of vehicle shown, the upstanding compartment walls 14 have inwardly extending top edges 20.

This invention includes a pair of cover lids 22 adapted to be pivotally secured along one of their edges as by a piano hinge, or other suitable hinge means 24, to the upper edge 20 of the upstanding opposite walls 14. The two lids 22 cooperate, when closed, to provide a complete cover, which cover has its rear edge 26 shaped to cooperate with the rear top edges of the compartment including the top edge 26' of the tail gate 16.

In order to provide a tight fit at the forward end of the compartment, the forward edges 28 of the cover lids 22 cooperate with a fill piece or adapter bar 30, which may be secured by means of bolts 32 through appropriate holes drilled in the forward wall of the compartment, where it merges with the rear wall 18 of the cab 12.

The fill piece or adapter bar 30 may be made of a bar of wood 31 covered with fiber-glass 33, or could be molded in one piece of a hard, impact-resistant plastic.

A drain groove 34 extends across the fill piece so as to dischrage any rain water over the sides 14 of the truck compartment.

The cover lids 22 each comprise a suitably shaped panel 36 having a slightly curved convex upper surface, when viewed in cross section, and provided with a bearing portion 38' along the edge to which the piano hinge 24 is secured, to cooperate with the top edge 20 of the compartment wall 14. A suitable longitudinal rib 38 is provided along the other edge of the cover lid parallel to its hinged edge, and front and rear end ribs 40 and 42 are also provided. Transverse reinforcing ribs 44 and 46 extend between the bearing surface 38' and the outer longitudinal rib 38, and additional reinforcing ribs may also be included, such as the longitudinal ribs 48 and 50 extending between transverse ribs 40 and 46, as shown.

In addition to the piano hinges 24 on which the cover lids 22 are oppositely hinged to the opposite compartment walls, there is provided a linkage 52 at the forward end of the cover lids and the compartment for assisting in opening the lids and in holding the lids open. This linkage consists of a pair of links 54 and 56 pivoted together at 58, together with a spring 60 normally urging the links 54 and 56 toward a straight line position. The other end of link 56 is pivoted at 62 to the forward rib 40 of each cover lid, and the other end of the other link 54 is pivoted at 64 to a pivot secured in the forward wall of the truck compartment. The linkage 52 permits the cover lids 22 to be completely closed, their mating edges, when closed cooperating in a conventional manner to provide a water-tight cooperating edge, with a conventional latching means (when necessary) to hold the cover lids closed and locked, the weight of the cover lids being usually sufficient to hold them in closed position, However, when the cover lids are opened, the spring 60 tends to urge them to open position and to hold them in open position when the weight of the lids is carried principally by the hinges 24.

Figure 4:
FIG. 4 is an elevational view of one of the rack bars.
Figure 5:
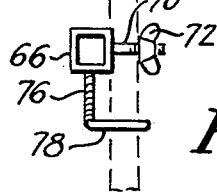
FIG. 5 is an end view of FIG. 4, showing in dash lines how it is attached to a rib on a cover lid.

A rack bar 66 is shown in FIGS. 4 and 5 for cooperation with the faces of the cover lids that face each other when open to provide a load carrying rack. The rack bar as shown is a square hollow tube, although it may obviously be cylindrical or any other shape, and is of a length to fit between the cover lids 22 when they are in their upward open position as shown in FIG. 2. Obviously, this is not the fully open position, as the cover lids must be capable of closing slightly toward each other to cooperate with the rack bars 66 which are secured to their inner faces, that is, the faces that face each other when open, adjacent the ends of at least one pair of aligned ribs 40, 44 or 46, that is, rib 46 on one cover lid being in alignment with the similar rib 46 on the other cover lid. As shown in FIG. 1, two rack bars 66 may be provided cooperating with ribs 40 and 46, but obviously, a third rack bar may be similarly secured, when desired or needed, on the rib 44, or only one rack bar may be provided on only one rib, to cooperate with a conventional load carrying bar 68 conventionally mounted in one or more locations on the top of the truck cab 12, the rack bar 66 being secured to the transverse rib of the cover lid so that it will be in the same plane with the cab top carrying bar 68.

As shown in FIGS. 4 and 5, the rack bar 66 has a threaded pin 70 extending from one side thereof at right angles thereto arranged to have a wing nut 72 threaded thereon, the threaded pin 70 being adapted to extend into an appropriate aperture in rib 46. Angularly extending from each end of the rack bar 66 is a brace member 76 terminating in a right angular pin end 78 extending into an appropriately located aperture 82 in the rib 46.

As shown, the rack bar 66 is secured to the rib 46, and a second rack bar may be similarly secured to the rib 40. Obviously, a third rack bar could be likewise secured to the intermediate rib 44, and the carrying bar 68 may be located anywhere along the top of the cab 12 or, if desired, a second carrying bar 68 may be located over the forward portion of the cab roof, in addition to the carrying bar 68 at the rearward portion of the cab roof, as shown.

The provision of several rack bars and additional carrying bars on the roof, of course, serve to distribute the load such as shown at 84, particularly when the load is in the form of longitudinal pieces such as long pieces of lumber or pipe. Obviously, still an additional rack bar 66 could be suitably secured to the ribs 42.

In operation, when a load such as 84 is not to be carried, the rack bars 66 may be themselves carried in the compartment of the truck 10 along with any other material or load that would fit within the compartment, and the lids 22 may be closed thereover, providing a neat appearance with everything in the compartment completely concealed. When a load too long to be carried in the compartment must be carried, then the covers are opened to the position shown, and one or more rack bars 66 are suitably secured, as shown, to an aligned rib of each cover lid, in the manner shown, as many rack bars being used as may be needed, according to the weight or length of the load.

The cab roof carrying bar 68 is likewise similarly carried in the compartment when not needed, and is mounted on the roof top as needed, in one or more suitable locations. As shown, the rack bars 66, when mounted, are in the same plane with each other, and also preferably, in the same plane with the carrying bars 68 that may be mounted on the cab roof, thus providing means for carrying a fairly long and somewhat heavy load with its weight distributed over the length of the open cover lids and, if necessary, also over the length of the cab roof and even extending a reasonable length forward and rearward thereof.

This application is a continuation-in-part of my copending application Serial No. 857,628, filed December 7, 1959, now abandoned.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination with a vehicle having an upwardly open rear compartment, the rear compartment including oppositely disposed upwardly extending walls and a forward wall; a combination cover and carrying rack comprising a pair of cover lids, hinge means pivotally securing each of said cover lids along one edge of each to the upper edge of one of said opposite walls, said cover lids being pivotal between a horizontal position cooperatively covering said open rear compartment and an upward position above said opposite walls, pivoted linkage connecting the forward portion of each cover lid to said forward wall for holding said lids in upward position, a pair of rack bars, and means for securing said pair of rack bars in parallel spaced relation to each other on said vehicle, said means including means securing at least one of said rack bars to the sides of said cover lids that face each other when said cover lids are in upward position to thereby provide a load carrying means.

2. The combination cover and carrying rack of claim 1, and a brace means extending angularly from each end of said last mentioned rack and cooperating with said cover lids.

3. The combination cover and carrying rack of claim 1, and an adapter bar mounted on said forward wall cooperating with the forward edges of said cover lids providing a tight fit when closed.

4. The combinaiton cover and carrying rack of claim 3, said adapter bar having a drainage channel extending along its length.

5. The combination cover and carrying rack of claim 1, said linkage including a pair of links, pivoted together at one of their ends, spring means urging said links to operate said cover lids toward open position, the other end of one link being pivoted to said forward wall and the other end of said other link being pivoted to the cover lid.

6. In combination with a vehicle having an upwardly open rear compartment, the rear compartment including oppositely disposed upwardly extending walls and a forward wall; a combination cover and carrying rack comprising a pair of cover lids, hinge means pivotally securing each of said cover lids along one edge of each to the upper edge of one of said opposite walls, said cover lids being pivotal between a horizontal position cooperatively covering said open rear compartment and an upward position above said opposite walls, pivoted linkage connecting the forward portion of each cover lid to said forward wall for holding said lids in upward position, a pair of rack bars and means for detachably securing said pair of rack bars in parallel spaced relation to each other to the sides of said cover lids that face each other when said cover lids are in upward position to thereby provide a load carrying means.

7. The combination and carrying rack of claim 6, said securing means including angular brace means on said rack bar cooperating with said cover lids.

8. In combination with a vehicle having an upwardly open rear compartment, the rear compartment including oppositely disposed upwardly extending walls and a forward wall; a combination cover and carrying rack comprising a pair of cover lids, hinge means pivotally securing each of said cover lids along one edge of each to the upper edge of one of said opposite walls, said cover lids being pivotal between a horizontal position cooperatively covering said open rear compartment and an upward position above said opposite walls, pivoted linkage connecting the forward portion of each cover lid to said forward wall for holding said lids in upward position, each said cover lid comprising a panel and a plurality of reinforcing ribs on the under side thereof, at least two of said ribs extending transversely thereof, said two transverse ribs of one cover lid being in alignment with said two transverse ribs of the other cover lid, and a pair of rack bars, and means for detachably securing said rack bars in spaced relation to each other to said two transverse ribs when said cover lids are in upward position to thereby provide a load carrying means.

9. The combination cover and carrying rack of claim 8, said rack bar securing means comprising a threaded pin at each end of each rack bar extending at right angles thereto extendable through apertures in said transverse ribs, and nut means threadable on said pins securing said racks against said transverse ribs.

10. The combination cover and carrying rack of claim 9 and a brace member extending angularly from each end of each said rack bar and terminating in a pin end parallel to said threaded pin and extendable into a second aperture in said rib.

References Cited in the file of this patent

UNITED STATES PATENTS

| | | |
|---|---|---|
| 1,136,643 | Berryman | Apr. 20, 1915 |
| 2,509,665 | Apel | May 30, 1950 |
| 2,901,286 | Harris | Aug. 25, 1959 |
| 2,909,387 | Burtzloff | Oct. 20, 1959 |